(12) United States Patent
Hagan et al.

(10) Patent No.: US 7,516,550 B2
(45) Date of Patent: Apr. 14, 2009

(54) SAW TOOL

(75) Inventors: John T. Hagan, Roscoe, IL (US); John W. Kroening, Rockford, IL (US); Ronald G. Axon, Rockton, IL (US)

(73) Assignee: Textron Innovations Inc., Providence, RI (US)

( * ) Notice: Subject to any disclaimer, the term of this patent is extended or adjusted under 35 U.S.C. 154(b) by 205 days.

(21) Appl. No.: 11/151,554

(22) Filed: Jun. 13, 2005

(65) Prior Publication Data

US 2006/0277761 A1 Dec. 14, 2006

(51) Int. Cl.
*B26B 1/08* (2006.01)

(52) U.S. Cl. .............................................. 30/162; 30/62
(58) Field of Classification Search ............... 30/62, 30/162

See application file for complete search history.

(56) References Cited

U.S. PATENT DOCUMENTS

| | | | |
|---|---|---|---|
| 692,092 | A | 1/1902 | Upham |
| 2,305,476 | A | 12/1942 | Johnson |
| 2,611,178 | A | 9/1952 | Whipple et al. |
| 2,904,373 | A | 9/1959 | Dowdy et al. |
| 3,061,327 | A | 10/1962 | Ensinger |
| 3,061,927 | A | 11/1962 | Ludwigsdorf |
| 3,857,176 | A | 12/1974 | Quenot |
| D257,943 | S | 1/1981 | Finlay |
| 4,271,592 | A | 6/1981 | Hoptner |
| 4,461,081 | A | 7/1984 | Gaskins |
| 4,586,256 | A | 5/1986 | Weimann |
| 4,630,373 | A | 12/1986 | Staurseth |
| 4,660,284 | A | 4/1987 | Decarolis |
| 4,675,996 | A | 6/1987 | DuBuque |
| D299,413 | S | 1/1989 | DeCarolis |
| 4,805,303 | A | 2/1989 | Gibbs |
| 4,884,307 | A | 12/1989 | Flood |
| 4,890,387 | A * | 1/1990 | Canino ........................... 7/118 |
| D307,106 | S | 4/1990 | Krebs |
| 4,918,820 | A | 4/1990 | Korb et al. |
| 5,023,996 | A * | 6/1991 | Pape et al. .................... 30/144 |
| 5,025,558 | A * | 6/1991 | Gilbert ........................ 30/162 |
| D319,378 | S | 8/1991 | Wilcox |
| 5,121,544 | A * | 6/1992 | Gilbert ........................ 30/162 |

(Continued)

FOREIGN PATENT DOCUMENTS

EP 834381 4/1998

(Continued)

*Primary Examiner*—Maurina Rachuba
(74) *Attorney, Agent, or Firm*—Trexler, Bushnell, Giangiorgi, Blackstone & Marr, Ltd.

(57) ABSTRACT

A tool is provided into which a saw blade can be mounted and removed therefrom. The tool includes a housing have a groove therein. An attachment assembly is mounted in the groove and can be slid within the groove. The attachment assembly includes a first part, a second part, and a member attaching the parts together, while allowing the parts to move relative to each other. The saw blade is inserted between the first and second parts and is removable therefrom. A spring retainer is affixed within the housing. The attachment assembly is moveable within the housing to abut against the spring retainer. When the attachment assembly abuts the spring retainer, the second parts can be moved out of engagement with each other to allow the removal of the saw blade from therebetween.

18 Claims, 8 Drawing Sheets

U.S. PATENT DOCUMENTS

| | | | |
|---|---|---|---|
| 5,303,469 A | 4/1994 | Yin-Han | |
| 5,337,481 A | 8/1994 | Mears | |
| D357,166 S | 4/1995 | Concari | |
| D368,633 S | 4/1996 | Nakayama | |
| D374,597 S | 10/1996 | Birkholz et al. | |
| 5,584,123 A | 12/1996 | Chi | |
| 5,603,162 A * | 2/1997 | Chen | 30/162 |
| 5,604,984 A | 2/1997 | Shepherd et al. | |
| D383,370 S | 9/1997 | Chen et al. | |
| 5,661,908 A | 9/1997 | Chen | |
| 5,727,320 A | 3/1998 | Shepherd et al. | |
| D394,597 S | 5/1998 | Shepherd et al. | |
| D403,225 S | 12/1998 | Okada | |
| D411,429 S | 6/1999 | Gringer | |
| D414,670 S | 10/1999 | Linden | |
| 5,960,544 A | 10/1999 | Beyers | |
| 5,960,545 A | 10/1999 | Shepherd et al. | |
| 6,000,136 A | 12/1999 | Owens | |
| D437,767 S | 2/2001 | Van Deursen | |
| 6,192,589 B1 | 2/2001 | Martone et al. | |
| D439,492 S | 3/2001 | Martone et al. | |
| 6,249,975 B1 * | 6/2001 | Lin | 30/162 |
| 6,314,646 B1 | 11/2001 | Schmidt | |
| 6,327,780 B1 | 12/2001 | Bigham et al. | |
| 6,357,120 B1 * | 3/2002 | Khachatoorian et al. | 30/162 |
| D462,250 S | 9/2002 | Ping | |
| 6,446,340 B1 | 9/2002 | Ping | |
| 6,446,341 B1 | 9/2002 | Wang et al. | |
| 6,467,173 B1 | 10/2002 | Umstead et al. | |
| 6,513,246 B2 * | 2/2003 | Ping | 30/125 |
| D472,786 S | 4/2003 | Cech et al. | |
| 6,553,674 B1 * | 4/2003 | Budrow | 30/162 |
| 6,694,620 B2 | 2/2004 | Kanzawa | |
| 6,742,261 B2 * | 6/2004 | Ho | 30/162 |
| 6,789,326 B1 * | 9/2004 | Huang | 30/517 |
| D500,240 S | 12/2004 | Fancelli | |
| D500,656 S | 1/2005 | Fancelli | |
| 2004/0163261 A1 * | 8/2004 | Lin | 30/162 |
| 2005/0022390 A1 | 2/2005 | Whitemiller et al. | |
| 2005/0138816 A1 | 6/2005 | Ping | |

FOREIGN PATENT DOCUMENTS

| | | |
|---|---|---|
| EP | 1334806 | 8/2003 |
| WO | WO 03/076142 | 9/2003 |

\* cited by examiner

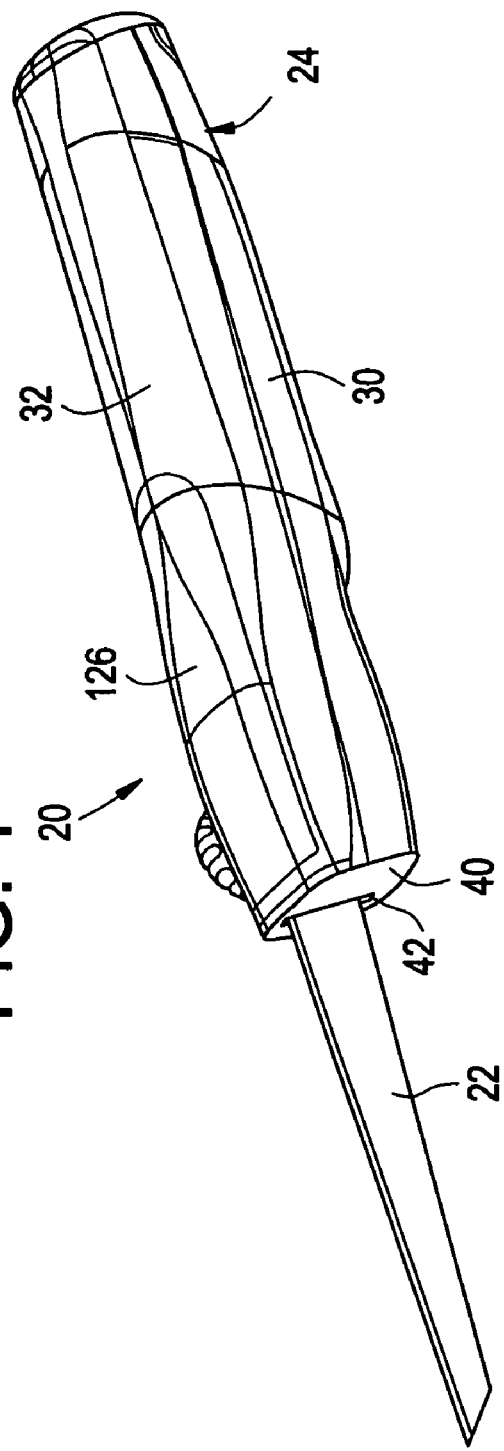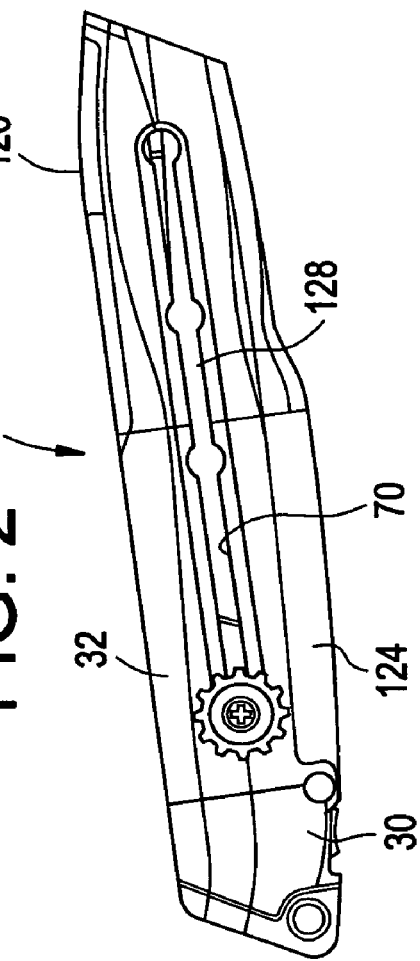

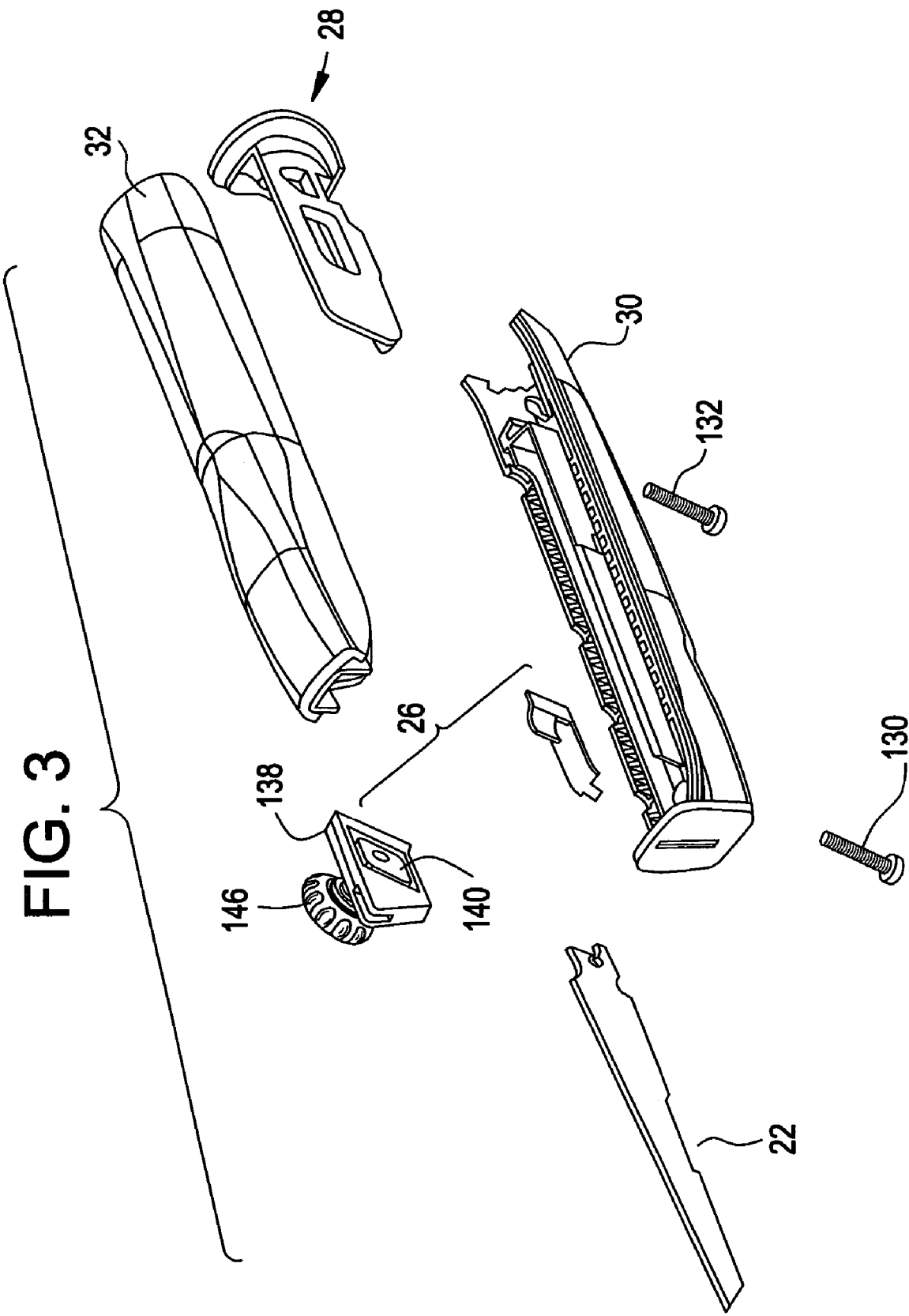

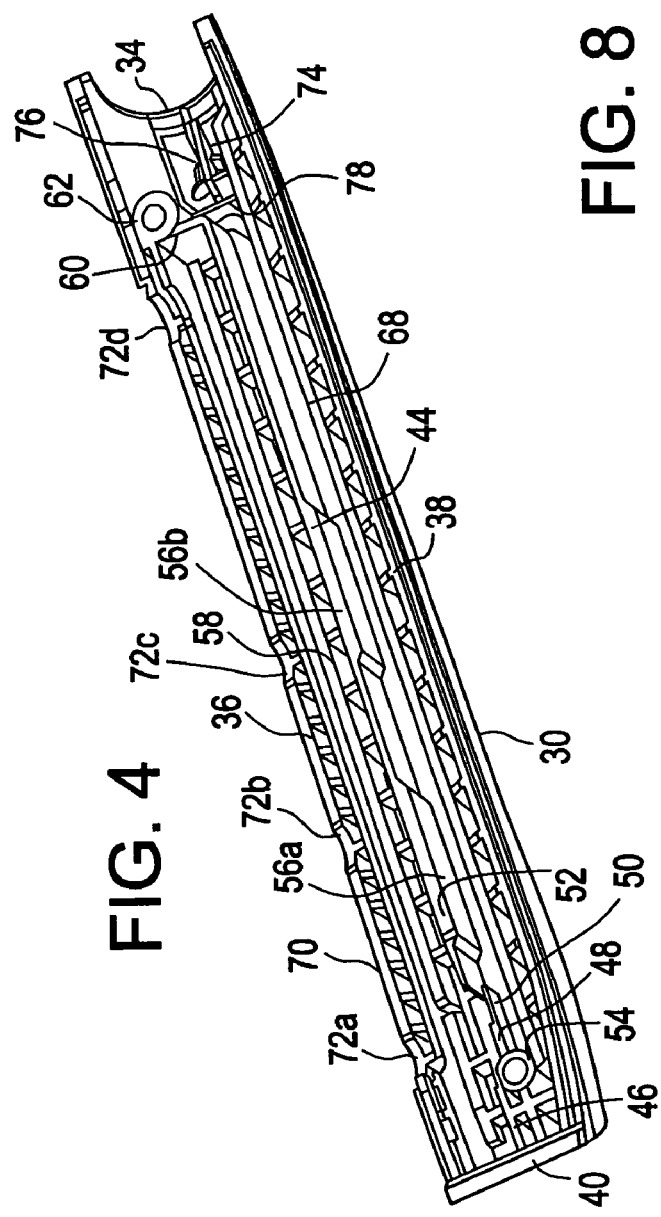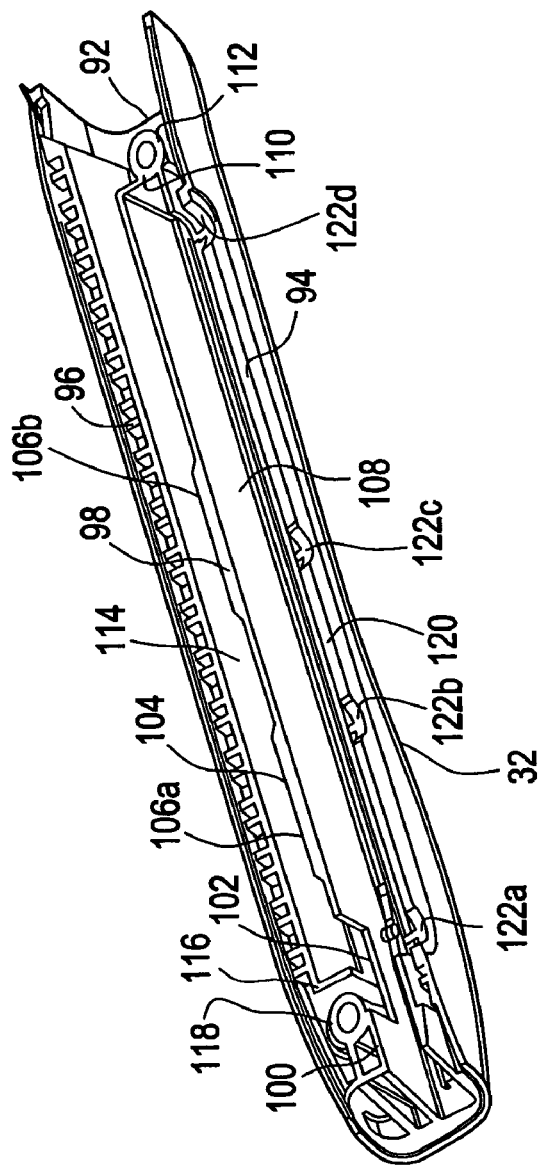

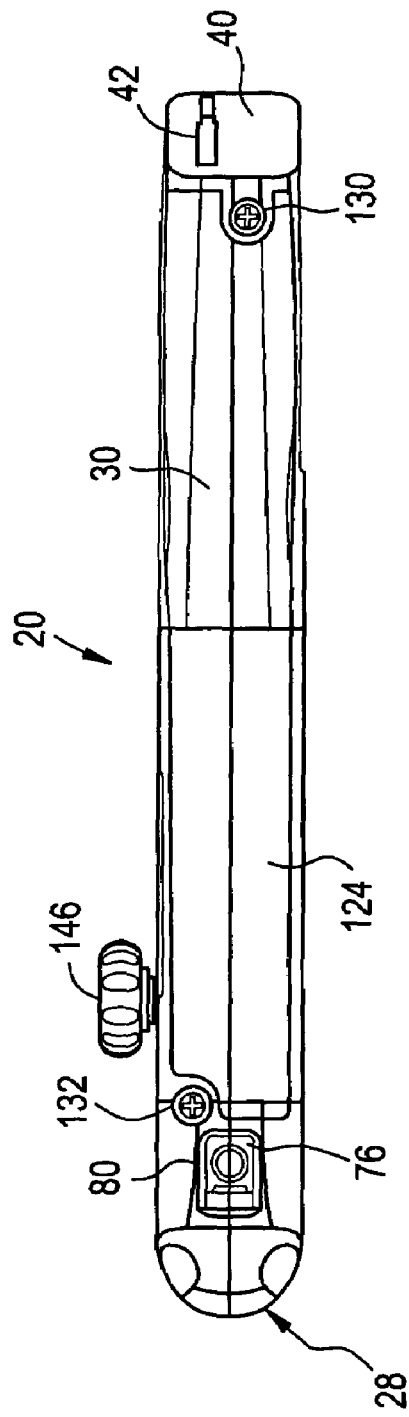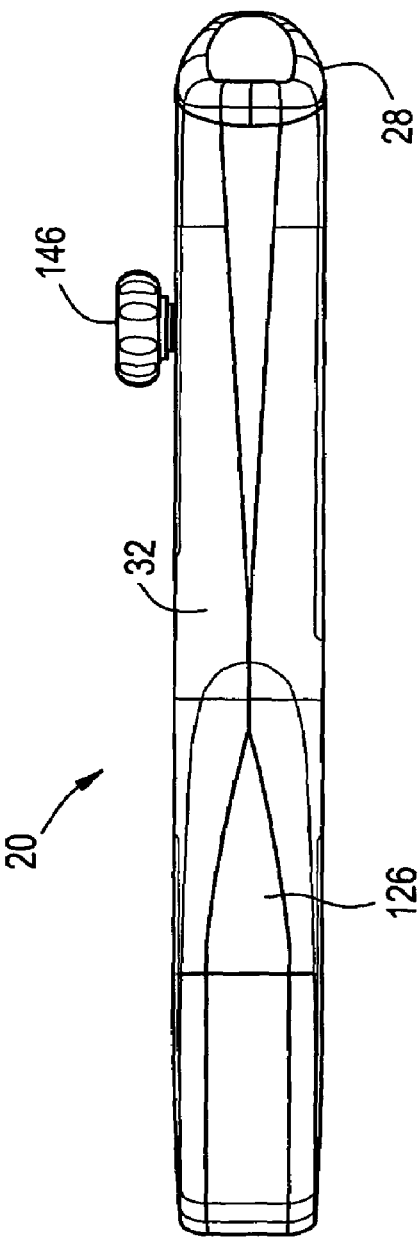

SAW TOOL

BACKGROUND OF THE INVENTION

This invention is generally directed to a tool which has a saw blade removable attached thereto. The saw blade can be easily detached from the tool without the use of a screwdriver. The saw blade can be extended for use, or retracted when not in use for safe storage.

Most prior art saw tools, such as the one disclosed in U.S. Pat. No. 4,660,284, have a saw blade attached within a frame comprised of two parts. The two parts and the saw blade are secured together by a screw that extends therethrough. To release the saw blade when it becomes worn or if a different type of saw blade is to be used, the user must use a screwdriver to remove the screw, before the saw blade can be removed from the frame. This increases the amount of work required in the field, as well as requires another tool.

U.S. Pat. No. 6,789,326 discloses a saw tool which does not require the use of an outside tool, such as a screwdriver, to release the saw blade which is held within a frame comprised of two parts. The frame includes a slider which is held within a locking member by two bars. The frame can be slid along the length of the tool to extend the saw blade for use, or to retract the saw blade for storage. The saw blade is sandwiched between the slider and the locking member. The locking member has a blade holder, which takes the form of a protrusion, mounted on a deflectable arm. The arm is deflected by pressing a press block on the locking member. The saw blade can be released anywhere along the length of the travel of the frame. Because the slider and the press block are adjacent to each other and because the saw blade can be released anywhere along the length of the travel of the frame, this may lead to the undesirable release of the saw blade if the press block is accidentally pressed during use of the tool.

The present invention provides a saw tool which overcomes the problems presented in the prior art and which provides additional advantages over the prior art, such advantages will become clear upon a reading of the attached specification in combination with a study of the drawings.

SUMMARY OF THE INVENTION

Briefly, the present invention is generally directed to a tool which has a saw blade removable attached thereto. The saw blade can be easily detached from the tool without the use of another tool, such as a screwdriver. The saw blade can be extended for use, or retracted when not in use for safe storage. A spare blade holder is provided and be accessed without the use of another tool, such as a screwdriver.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a saw tool which incorporate the features of the present invention, which has a saw blade attached thereto;

FIG. 2 is a side elevational view of the saw tool;

FIG. 3 is an exploded, perspective view of the saw tool;

FIG. 4 is a perspective view of a bottom housing;

FIG. 8 is a perspective view of a top housing;

FIG. 9 is a bottom elevational view of the saw tool;

FIG. 10 is a top elevational view of the saw tool;

DETAILED DESCRIPTION OF THE ILLUSTRATED EMBODIMENT

Figure 5:
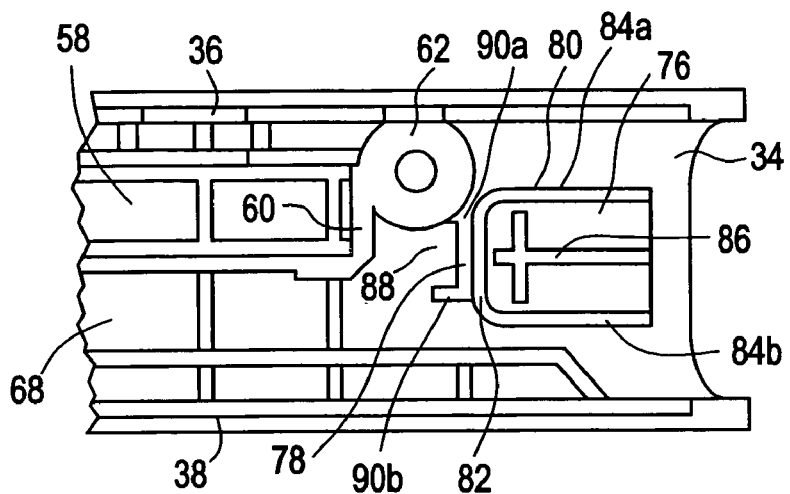
FIG. 5 is a top elevational view of a rear portion of the bottom housing.
Figure 6:
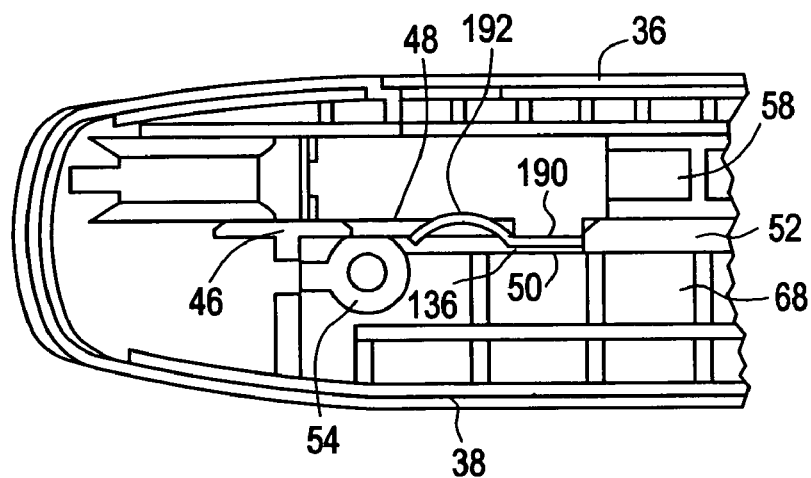
FIG. 6 is a top elevational view of a front portion of the bottom housing, with a spring retainer positioned therein.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

A preferred embodiment of a saw tool 20 is shown in the drawings to which a saw blade 22 can be attached and removed. The tool 20 includes a housing 24, a saw blade sliding and attachment mechanism 26 mounted within the housing 24, and a spare blade holder 28 mounted within the housing 24. The saw blade sliding and attachment mechanism 26 provides a quick release for releasing the saw blade 22 therefrom without the use of other tools, such as a screwdriver. The spare blade holder 28 provides for replacement saw blades 22' mounted within the housing 24. The spare blade holder 28 can be released from the housing 24 without the use of other tools, such as a screwdriver. The housing 24 includes a lower housing 30 and an upper housing 32, each formed of plastic.

While lower, upper, front, rear and the like are used in the describing the tool 20, these descriptors are primarily used for convenience in describing the invention, although they do denote the preferred orientation for use of the tool 20.

The lower housing 30 is best shown in FIGS. 4-7. The lower housing 30 has a base wall 34 and upstanding first and second side walls 36, 38 which extend therefrom, and a front wall 40 which closes the front ends thereof. A slot 42 is provided through the front wall 40. The front wall 40 angles outwardly and upwardly from the base wall 34.

A rib 44 extends generally perpendicular to the base wall 34 at approximately the midpoint between the first and second side walls 36, 38. The rib 44 includes a first section 46 which extends from a point spaced from the front wall 40 towards the rear of the lower housing 30, a second section 48 which extends from the first section 46, a third section 50 which extends rearwardly from the second section 48, and a fourth section 52 which extends rearwardly from the third section 50 to a point which is spaced a predetermined distance from a rear end of the base wall 34. On the side of the rib 44 which faces the first side wall 36, the surfaces of the first, second and fourth sections 46, 48, 52 are planar. The surface of the third section 50 which faces the first side wall 36 is recessed from the first, second and fourth sections 46, 48, 52, and thus is further away from the first side wall 36, but is parallel thereto. In addition, the first and fourth sections 46, 52 have heights (distance from the base wall 34) which are approximately equal. The second and third sections 48, 50 have heights which are approximately equal, but are less than the height of the first and fourth sections 46, 52. On the side of the rib 44 which faces the second side wall 38, a screw counterbore 54 is proximate to the second section 48 and a pair of spaced protrusions 56a, 56b extend from the fourth section 52. Alternatively, a single protrusion may be provided.

Figure 7:
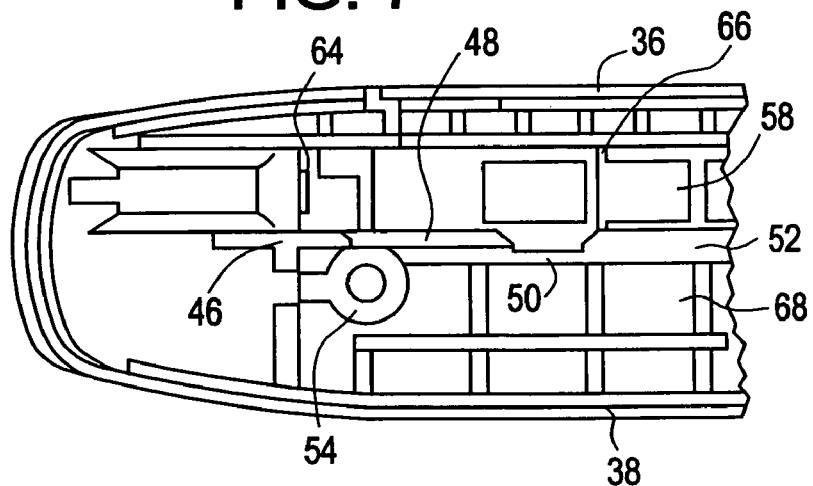
FIG. 7 is a top elevational view of a front portion of the bottom housing, with the spring retainer removed therefrom.
Figure 11:
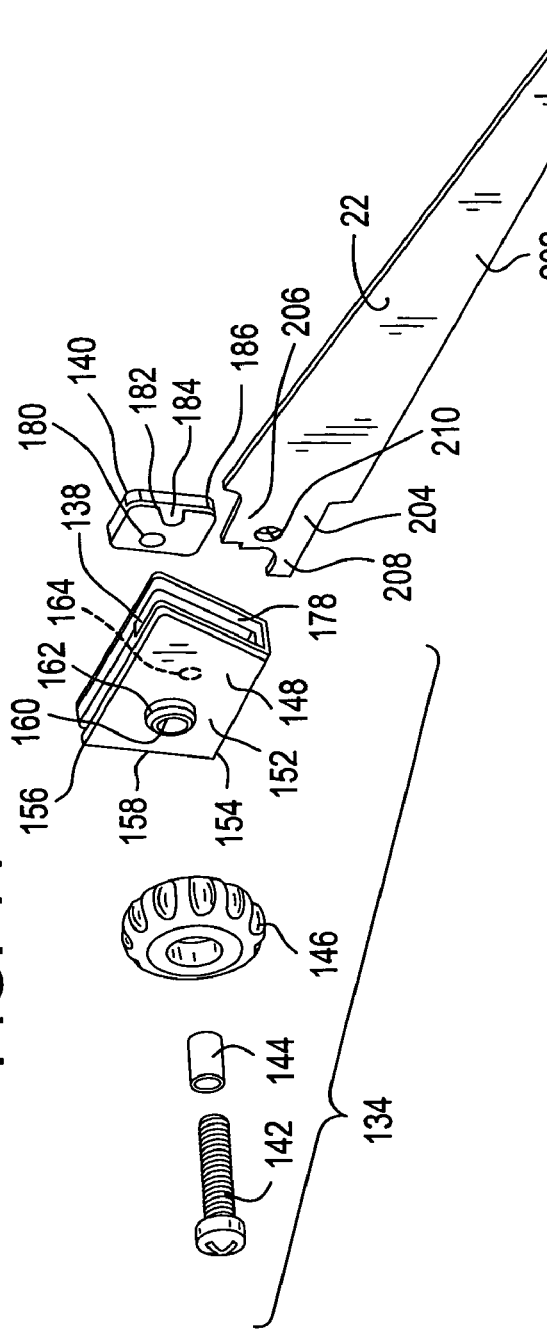
FIG. 11 is an exploded perspective view of an attachment assembly used to attach a saw blade, also shown in a perspective view, within the saw tool.
Figure 12:
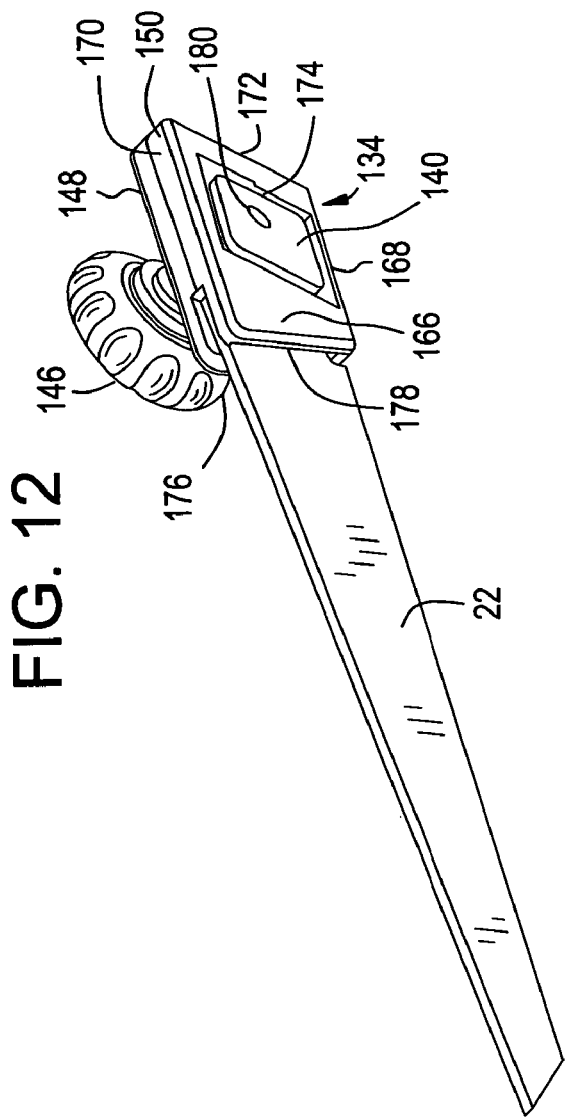
FIG. 12 is a perspective view of the saw blade attached to the attachment assembly of FIG. 11.

A first groove 58 is provided between the rib 44 and the first side wall 36. The side walls of the first groove 58 are defined by the rib 44, the first side wall 36 and the base wall 34. A front end of the first groove 58 is substantially closed by the front wall 40, but the first groove 58 opens to the slot 42 in the front wall 40. A rear end wall 60 of the first groove 58 extends between the first side wall 36 and the rib 44. Proximate the rear end wall 60, on the side opposite to the first groove 58, a screw counterbore 62 is provided. The screw counterbore 62 is spaced from the rear end of the lower housing 30. As shown in FIG. 7, proximate the front end of the first groove 58, a first recess 64 is provided in the base wall 34 and extends across at least a portion of the first groove 58 proximate the first section 46. A second recess 66 is provided in the base wall 34 and extends across the width of the first groove 58 proximate the juncture of the third section 50 to the fourth section 52.

A second groove 68 is provided between the rib 44 and the second side wall 38. The side walls of the second groove 68 are defined by the rib 44, the second side wall 38 and the base wall 34. The screw counterbore 54 is provided at the front end of the second groove 68 and forms a front end wall thereof. The rear end of the second groove 68 is open to the rear end of the lower housing 30.

As shown in FIGS. 2 and 4, the upper end of the first side wall 36 has a reduced height portion 70 which extends along a predetermined length thereof. The front end of the reduced height portion 70 generally aligns with the front end of the second section 48 of the rib 44. The rear end of the reduced height portion 70 generally aligns with the rear end of the fourth section 52 of the rib 44. A plurality of spaced apart arcuate recesses 72a, 72b, 72c, 72d are provided along the length of the reduced height portion 70. One such recess 72a is provided at the front end of the reduced height portion 70 and another such recess 72d is provided at the rear end of the reduced height portion 70. Other such recesses 72b, 72c are spaced along the length of the reduced height portion 70. As shown, four such recesses 72a, 72b, 72c, 72d are provided, but it is to be understood that more or fewer may be provided. While the recesses 72a, 72b, 72c, 72d are shown as arcuate, other shapes may be provided.

As best shown in FIGS. 4 and 5, proximate the rear end of the lower housing 30, a blade capture and release mechanism 74 is provided. The blade capture and release mechanism 74 includes a release 76 which is formed in the base wall 34 of the lower housing 30 and a retaining wall 78 provided on the base wall 34.

The release 76 is formed by providing a generally U-shaped slot 80 in the base wall 34 to define a tab than can be flexed relative to the remainder of the base wall 34. The slot 80 includes a base section 82 and side sections 84a, 84b. The side sections 84a, 84b are parallel to the side walls 36, 38 of the lower housing 30 and a rear end of each side section 84a, 84b is proximate, but spaced a predetermined distance from, the rear end of the housing 24. The base section 82 is provided at the front end of each side section 84a, 84b and is generally perpendicular to the side sections 84a, 84b. A cam surface 86 is provided on the release 76 and extends from the rear end of the release 76 defined at the rear ends of the side sections 84a, 84b towards the front end of the release 76 defined at the base section 82. The cam surface 86 slopes upwardly from the rear end of the release 76 to the front end of the release 76 and away from the base wall 34.

The retaining wall 78 is provided on the base wall 34, proximate to the base section 82 of the slot 80 and extends parallel to the base section 82. The retaining wall 78 has a height which is equal to the greatest height of the cam surface 86. A pocket 88 is defined on the side of the retaining wall 78 opposite to the slot 80. If desired, side walls 90a, 90b may extend from the retaining wall 78 to further define the pocket 88.

As best shown in FIG. 8, the upper housing 32 has a base wall 92 and upstanding first and second side walls 94, 96 which extend therefrom. The front ends of the first and second side walls 94, 96 angle inwardly and downwardly from the base wall 92.

A rib 98 extends generally perpendicular to the base wall 92 at approximately the midpoint between the first and second side walls 94, 96. The rib 98 includes a first section 100 which extends from the front end of the upper housing 32 towards the rear end of the upper housing 32, a second section 102 which extends rearwardly from the first section 100, and a third section 104 which extends rearwardly from the second section 102 to a point which is spaced a predetermined distance from a rear end of the base wall 92. On the side of the rib 92 which faces the first side wall 94, the surfaces of the sections 100, 102, 104 form a planar surface. The first and third sections 100, 104 have a height (distance from the base wall 92) which is approximately equal, and the second section 102 has a height which is less than the height of the first and third sections 100, 104. On the side of the rib 92 which faces the second side wall 96, a pair of spaced protrusions 106a, 106b extend therefrom. Alternatively, a single protrusion may be provided.

A first groove 108 is provided between the rib 98 and the first side wall 94. The side walls of the first groove 108 are defined by the rib 98, the first side wall 94 and the base wall 92 of the upper housing 32. A front end of the first groove 108 is open. A rear end wall 110 of the first groove 108 extends between the first side wall 94 and the rib 98. Proximate the rear end wall 110, on the side opposite to the first groove 108, a screw counterbore 112 is provided. The screw counterbore 112 is spaced from the rear end of the upper housing 32.

A second groove 114 is provided between the rib 98 and the second side wall 96. The side walls of the second groove 114 are defined by the rib 98, the second side wall 98 and the base wall 92 of the upper housing 32. A front end wall 116 of the second groove 114 extends between the rib 98 and the second side wall 96. Proximate the front end wall 116, on the side opposite to the second groove 114, a screw counterbore 118 is provided. The screw counterbore 118 is spaced from the front end of the upper housing 92. The rear end of the second groove 114 is open to the rear end of the upper housing 92.

As shown in FIGS. 2 and 8, the lower end of the first side wall 94 has a reduced height portion 120 which extends along a predetermined length thereof. The front end of the reduced height portion 120 generally aligns with the front end of the second section 102 of the rib 98. The rear end of the reduced height portion 120 generally aligns with the rear end of the third section 104 of the rib 98. A plurality of spaced apart arcuate recesses 122a, 122b, 122c, 122d are provided along the length of the reduced height portion 120. One such recess 122a is provided at the front end of the reduced height portion 120 and another such recess 122d is provided at the rear end of the reduced height portion 120. Other such recesses 122b, 122c are spaced along the length of the reduced height portion 120. As shown, four such recesses 122a, 122b, 122c, 122d are provided, but it is to be understood that more or fewer may be provided. While the recesses 122a, 122b, 122c, 122d are shown as arcuate, other shapes may be provided.

The lower and upper housings 30, 32 have elastomeric grips 124, 126 provided thereon. The grips 124, 126 provide a more ergonomic grip and feel to the tool 20 when the tool 20 is being tightly gripped by the user during use.

The lower and upper housings 30, 32 are mated together to form the completed housing 24 in which the saw blade sliding and attachment mechanism 26 and the spare blade holder 28 are held. When mated together, the ends of the first side walls 36, 94 abut each other, the second side walls 38, 96 abut each other, the ends of the ribs 44, 98 abut each other, the front wall 40 of the lower housing 30 sits against the front ends of the side walls 94, 95 of the upper housing 32. The first section 46 of the rib 44 in the lower housing 30 aligns and abuts with the first section 100 of the rib 98 in the upper housing 32; the second section 48 of the rib 44 in the lower housing 30 aligns with the front portion of the second section 102 of the rib 98 in the upper housing 32; the third section 50 of the rib 44 in the lower housing 30 aligns with the rear portion of the second section 102 of the rib 98 in the upper housing 32; and the fourth section 52 of the rib 44 in the lower housing 30 aligns and abuts with the third section 104 of the rib 98 in the upper housing 32 and the protrusions 56a, 106a; 56b, 106b respectively align. As a result, the first grooves 58, 108 align and the second grooves 68, 114 align. The reduced height portions 70, 120 align with each other to form an elongated slot 128 as shown in FIG. 2. The spaced apart arcuate recesses 56a, 122a; 56b, 122b; 56c, 122c; 56d, 122d align with each other to form circular openings as shown in FIG. 2. The ends of the screw counterbores 54, 118 abut to form a passageway, and the ends of the screw counterbores 62, 112 abut to form a passageway. Ribs can be provided on upper ends of the side walls 36, 38 of the lower housing 30 to mate with pockets formed in the lower ends of the side walls 94, 96 of the upper housing 32, or vice versa, to ensure proper alignment and to prevent side to side movement of the lower housing 30 relative to the upper housing 32. Once mated, screws 130, 132 are mounted in the aligned counterbores 54, 118; 62, 112 to permanently mate the lower and upper housings 30, 32 together to form the completed housing 24.

Attention is now invited to the saw blade sliding and attachment mechanism 26 best shown in FIGS. 3 and 11-13. The saw blade sliding and attachment mechanism 26 includes an attachment assembly 134 and a spring retainer 136. The saw blade sliding and attachment mechanism 26 is mounted within the aligned first grooves 58, 108 and can be slid therein. The saw blade 22 is releasably held by the attachment assembly 134 within the housing 22. The spring retainer 136 is mounted in the first groove 58 of the lower housing 30 and extends into the first groove 108 of the user housing 32.

The attachment assembly 134 includes a first part or frame 138, a second part or locking insert 140, a fastener 142 such as a screw, a threaded insert 144 and a knob 146. The frame 138, the locking insert 140, the fastener 142 and the threaded insert 144 are preferably formed of metal. The knob 146 is preferably formed of plastic. The spring retainer 136 is preferably formed of spring steel. The frame 138 includes a first section 148 and a second section 150 which are mated together by suitable means, such as welding.

The first section 148 has a side wall 152 which has a substantially planar outer surface, lower and upper walls 154, 156 that extend perpendicularly from the side wall 152 at lower and upper ends thereof respectively, and a rear wall 158 that extends perpendicularly from the side wall 152 at the rear end thereof. The front end of the side wall 152 angles outwardly and upwardly from the lower wall 154, and the rear end of the side wall 152 is perpendicular to the lower and upper walls 154, 156. The upper wall 156 extends from the rear wall 158 to a predetermined position which is spaced from the front end of the side wall 152. An aperture 160 is provided through the side wall 152 at a position proximate to, but spaced from, the rear wall 158 and at the midpoint between the lower and upper walls 154, 156. A protrusion 162 encircles the aperture 160 on the outer surface of the side wall 152 and extends outwardly therefrom. A retention recess 164 is provided on the inner surface of the side wall 148 proximate to, but spaced from, the aperture 160.

The second section 150 has a substantially planar side wall 166, lower and upper walls 168, 170 that extend perpendicularly from the side wall 166 at upper and lower ends thereof respectively, and a rear wall 172 that extends perpendicularly from the side wall 166 at the rear end thereof. The front end of the side wall 166 angles outwardly and upwardly from the lower wall 168, and the rear end of the side wall 166 is perpendicular to the lower and upper walls 168, 170. The upper wall 170 extends from the rear wall 172 to a predetermined position which is spaced from the front end of the side wall 166. A cutout 174 is provided through the side wall 166. As shown, the cutout 174 is generally square, but other shapes may be provided.

When the first and second sections 148, 150 are mated, the ends of the upper walls 154, 170 abut, the ends of the lower walls 156, 172 abut, and the ends of the rear walls 158, 174 abut such that a cavity is formed between the first and second sections 148, 150. The front ends of the side walls 152, 166 are spaced apart from each other to form an entry opening. Preferably, the front end of each side wall 152, 166 has a chamfer 176, 178 provided thereon so that the saw blade 22 is guided into the cavity between the first and second sections 148, 150 during insertion. The aperture 160 and the retention recess 164 in the side wall 148 of the first section 148 are exposed within the cutout 174 in the side wall 166 of the second section 150.

The locking insert 140 fits within the cutout 174 provided in the second section 150. The locking insert 140 preferably has a shape which corresponds to the cutout 174. In the illustrated embodiment therefore, the locking insert 140 is square, but other shapes may be provided. The locking insert 140 is not required to be of the same shape as the cutout 174, but the outer surface of the locking insert 140 is preferably planar. A threaded aperture 180 is provided through the locking insert 140 at a position which is approximately midway between the upper and lower edges of the locking insert 140. The inner surface of the locking insert 140 is preferably planar, with the exception of a retention boss 182 which is provided along a front edge thereof at the midpoint between the upper and lower edges thereof. The retention boss 182 is spaced from the threaded aperture 180. The retention boss 182 has a tapered surface 184 provided on the front edge thereof. In addition, the inner surface of the locking insert 140 has a chamfer 186 provided along the front edge thereof which aligns with the tapered surface 184 on the retention boss 182.

The threaded insert 144 is mounted within the knob 146. The knob 146 can include ridges thereon to enable a user to more easily grip the knob 146. The fastener 142 threadedly engages with the threaded insert 144.

To mate the frame 148 and the locking insert 150 together, the locking insert 150 is positioned with the cutout 174. When so positioned, the threaded aperture 180 in the locking insert 140 aligns with the aperture 160 through the side wall 152 and the retention boss 182 seats with the retention recess 164. The end of the fastener 142 has the knob 146 threaded thereon, is inserted through the protrusion 162 and then through the apertures 162, 180. The end of the fastener 142 does not extend beyond the outer surface of the locking insert 140.

The attachment assembly 134 is mounted in the first groove 58 in the lower housing 30 prior to the mating of the lower and upper housings 30, 32 such that the outer surface of the locking insert 140 faces the rib 44. When the upper housing 32 is mated to the lower housing 30, the attachment assembly 134 is sandwiched therebetween and the fastener 142 extends through the elongated slot 128, such that the knob 146 is on the exterior of the housing 24. The attachment assembly 134 is now seated in both first grooves 58, 108. The first grooves 58, 108 have a width which is slightly greater than the thickness of the frame 138 and thus the locking insert 140 is trapped between the ribs 44, 98 and the frame 138 along the length of the fourth section 52 of the rib 44 in the lower housing 30 and the third portion 104 of the rib 98 in the upper housing 32. To lock the attachment assembly 134 into position relative to the housing 24, the knob 146 is rotated such that the knob 146 translates on the fastener 142, thereby drawing the locking insert 140 closer to the first section 148 of the frame 138, until the knob 146 frictionally engages against the outer surface of the housing 24. To allow the attachment assembly 134 to slide relative to the housing 24, the knob 146 is rotated in the opposite direction such that the knob 146 disengages from the housing 24. The locking insert 140 will remain seated within the cutout 174 because the width of the first grooves 58, 108 prevents the locking insert 140 from completely unseating from the frame 138, however, there is some play therein such that the inner surface of the locking insert 140 does not necessarily remain in contact with the inner surface of the side wall 152 of the frame 138. The retention boss 182, however, does remain at least partially seated within the retention recess 164 in the frame 138.

Figure 13:
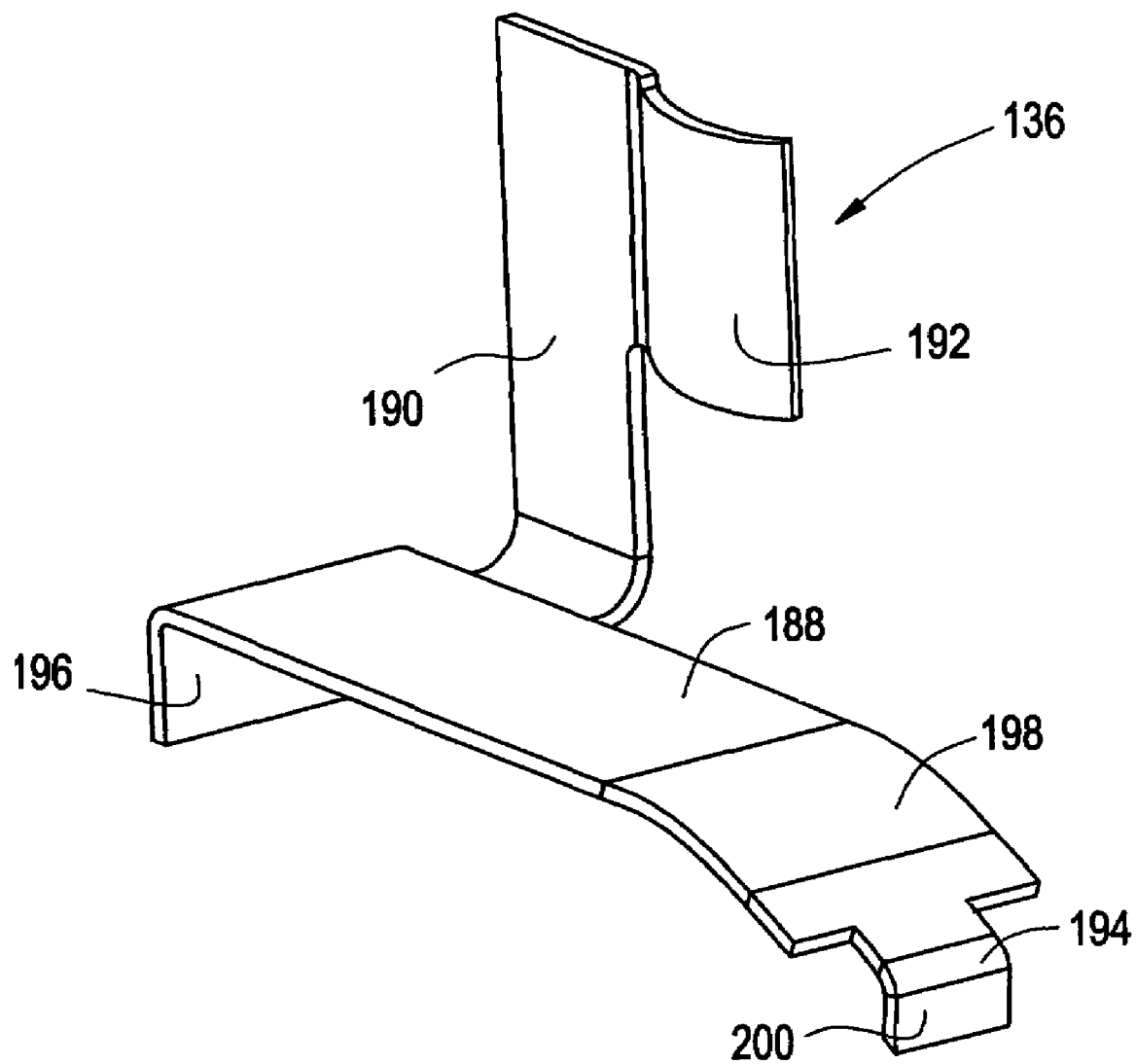
FIG. 13 is a perspective view of a spring retainer.

The spring retainer 136, best shown in FIG. 13, includes a generally horizontal leg 188, a vertical leg 190 and an arcuate arm 192. The leg 188 includes a front foot 194 at a front end thereof and a rear foot 196 at a rear end thereof. The front foot 194 has a tapered portion 198 that extends downwardly and forwardly of the leg 188 and an end portion 200 that is generally perpendicular to the leg 188. The rear foot 196 is generally perpendicular to the leg 188. The vertical leg 190 extends substantially perpendicularly from a side of the generally horizontal leg 188 proximate the rear foot 196. The arcuate arm 192 extends from the vertical leg 190 proximate the upper end thereof and towards the front foot 194 of the leg 188. When view from above, the arcuate arm 192 overlaps the leg 188. The spring retainer 136 is preferably integrally formed of spring steel.

Initially, the spring retainer 136 is mounted within the lower housing 30 prior to the mating of the lower and upper housings 30, 32. When so mounted, the generally horizontal leg 188 sits on the bottom wall of the first groove 58 and the end portion 200 of the front foot 194 seats within the first recess 64 in the base wall 34 and the rear foot 196 seats within the second recess 66 in the base wall 34. The vertical leg 190 abuts against the third section 50 of the rib 44, but does not extend past the planar face of the fourth section 52. The arcuate arm 192 is positioned above the second section 48 extends past the planar face of the fourth section 52 and into the first groove 58. The tops of the vertical leg 190 and the arcuate arm 192 are positioned above the upper end of the rib 44. When the upper housing 32 is mated to the lower housing 30, the upper portions of the vertical leg 190 and the arcuate arm 192 seat within the second portion 102 of the rib 98 in the upper housing 32. The vertical arm 192 does not extend past the planar face of the third section 104. The arcuate arm 192 extends past the planar face of the third section 104 into the first groove 108 in the upper housing 32.

When the attachment portion 134 is slid all of the way to the front of the first grooves 58, 108, the locking insert 140 abuts against the arcuate arm 192 of the spring retainer 136. In this position, the arcuate arm 192, not the ribs 44, 98, holds the locking insert 140 in the frame 138. As a result, the retention boss 182 on the locking insert 140 can be moved out of engagement with the retention recess 164 in the side wall 152 of the frame 138. This will allow a saw blade 22 to be inserted into the attachment portion 134, or if a saw blade 22 had previously been inserted, will allow a user to remove the saw blade 22 from the attachment portion 134. The generally horizontal leg 188 provides a buffer between the saw blade 22 and the base wall 34 of the lower housing 30 to ensure that the saw blade 22 does not cut the base wall 34 over time as the saw blade 22 is being slid back and forth within the housing 24. The generally horizontal leg 188, because it is not completely horizontal, also supplies some vertical position once the saw blade 22 is in the fully extended position.

The saw blade 22 has a saw portion 202 and an attachment portion 204 provided at a rear end of the saw portion 202. The attachment portion 205 has a first stepped portion 206 adjoined to the rear end of saw portion 202, and a second stepped portion 208 which extends from the first stepped portion 206. The first stepped portion 206 has a height which is less than the rear end of the saw portion 202. The second stepped portion 208 has a height which is less than the first stepped portion 206. A retention hole 210 is provided through the first stepped portion 206 proximate the second stepped portion 208.

To insert the saw blade 22, the first and second stepped portions 206, 208 are inserted through the entry opening of the frame 138 and into the cavity. The chamfers 176, 178 on the side walls 152, 166 of the frame 138 aid in the entry of the saw blade 22 therein. The second stepped portion 208 engages against the chamfer 186 on the front edge of the locking insert 140 and against the tapered surface 184 on the retention boss 182. This causes the locking insert 140 to move away from the side wall 152 of the frame 138 and to bear against the arcuate arm 192 of the spring retainer 136. The arcuate arm 192 and the upper portion of the vertical leg 190 deflect away from the first side walls 36, 94, thereby completely unseating the retention boss 182 from the retention recess 164. The saw blade 22 is inserted into the cavity until the rear end of the second stepped portion 208 abuts the rear walls 158, 172 and the rear end of the saw portion 202 abuts against the lower and upper walls 154, 168, 156, 170. The second stepped portion 208 sits below the fastener 142. Once the retention hole 210 in the saw blade 202 aligns with the retention recess 164 in the frame 138, the retention boss 182 is deflected into the retention hole 210 and retention recess 164 by the spring retainer 136 as the spring retainer 136 resumes its natural state and the previously deflected vertical leg 190 and arcuate arm 192 returns to its vertical position. The saw blade 22 is therefore trapped between the locking insert 140 and the frame 138. The attachment assembly 134 and saw blade 22 can then be slid along the length of the first grooves 58, 108 so that the saw blade 22 can be placed in different extending positions relative to the housing 22, or in a completely retracted position within the housing 22.

The tool 20 is configured so that the saw blade 22 can be fully retracted or extended, depending on the user's needs. When the saw blade 22 is fully extended, the tool 20 can be used in any application for which a hole saw or small hand saw is used, such as cutting holes in drywall as well as wooden and metallic structures. The saw blade 22 can be fully retracted when not be used, preventing possible injury to the user while carrying the tool 20.

To remove the saw blade 22, the attachment assembly 134 is again slid all of the way to the front of the first grooves 58, 108. In this position, the locking insert 140 abuts against the arcuate arm 192 of the spring retainer 134 and the arcuate arm 192, not the ribs 44, 98, holds the locking insert 140 within the frame 138. The knob 146 is pushed inwardly by the user, thereby pushing the locking insert 140 out of the frame 138 and against the arcuate arm 192. The arcuate arm 192 and the upper portion of the vertical leg 190 deflect away from the first side walls 36, 94, thereby unseating the retention boss 182 from the retention recess 164 in the frame 134 and from the retention hole 210 through the saw blade 22. The saw blade 22 can then be slid outwardly from between the frame 138 and the locking insert 140 and out of the housing 22. Thus, the saw blade 22 can only be removed when it is moved all of the way to the front of the housing 24. This prevents the accidental release of the saw blade 22 in any other position along the first grooves 58, 108. In addition, while the spring retainer 134 is shown as a spring preferably formed of spring steel, it is be understood that other forms of resilient members may be used, such as a rubber block fitted to perform the function of the spring retainer 134.

Figure 14:
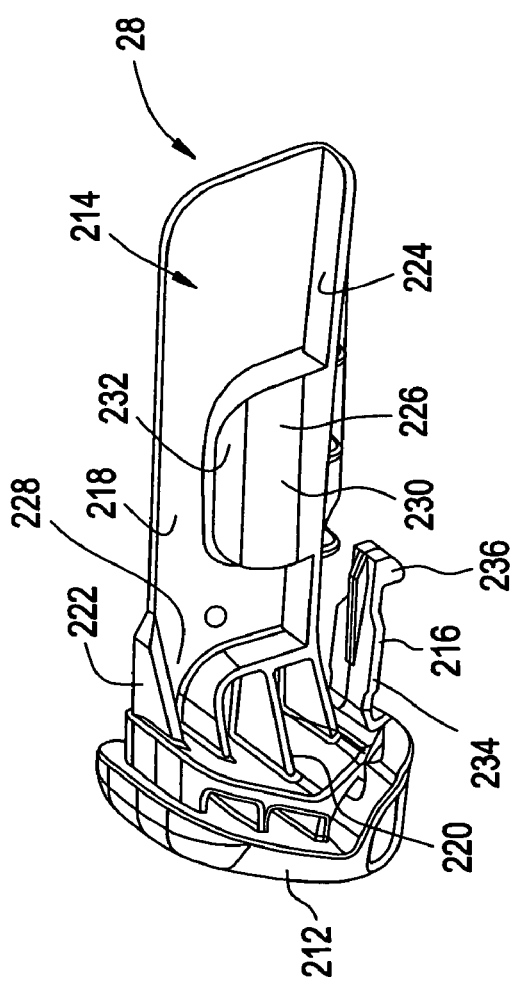
FIG. 14 is a perspective view of a spare blade holder.
Figure 15:
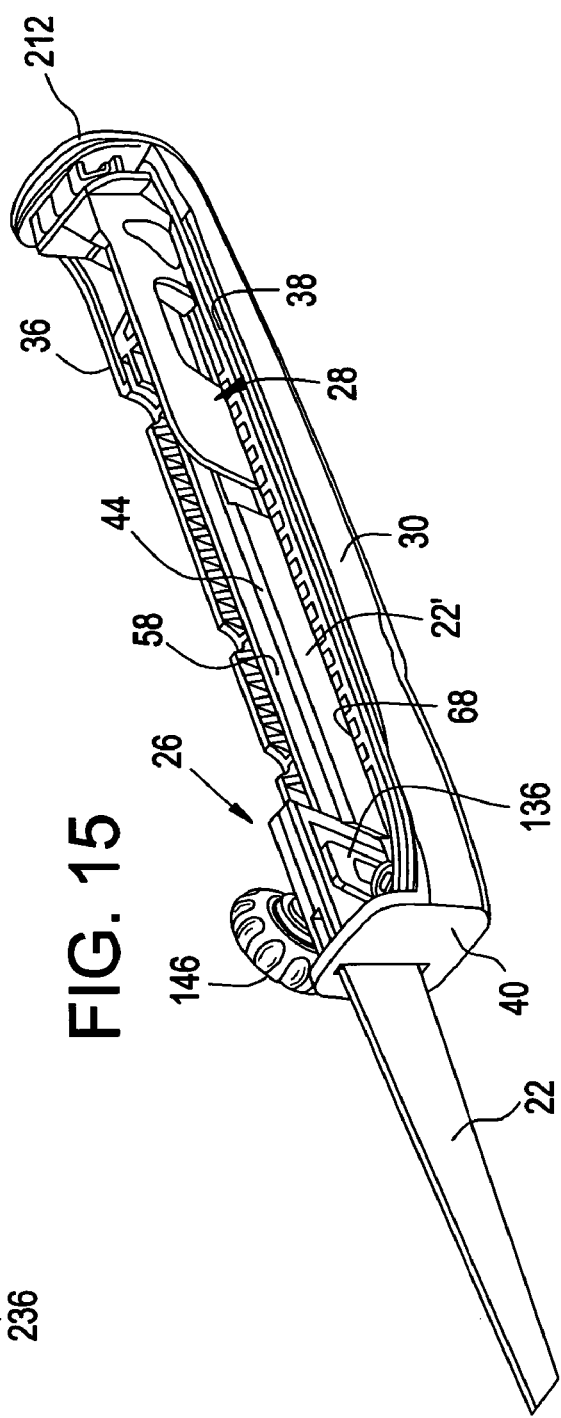
FIG. 15 a perspective view of the tool, with the top housing removed and the saw blade attached thereto.

Attention is now invited to the spare blade holder 28 shown most clearly in FIG. 14. The spare blade holder 28 provides replacement blade storage inside the tool 20 that can be easily accessed in the event that the saw blade 22 becomes dull in use or a different type of saw blade is desired. The spare blade holder 28 does not require another tool to open it.

The spare blade holder 28 includes a rear wall 212, a plate 214 extending perpendicularly therefrom and a latch 216 extending in the same direction as the plate 214. The rear wall 212 is shaped to cover the rear end of the housing 24 after the lower and upper housings 30, 32 are mated.

The plate 214 is formed from an elongated wall 218 which has lower and upper support walls 220, 222, a locking rib 224 and a flanged clip 226. The elongated wall 218 extends from the rear wall 212. The lower and upper support walls 220, 222 extend from the rear wall 212 and along one side of the elongated wall 218. A gap 228 is formed between the lower and upper support walls 220, 222. The locking rib 224 extends perpendicularly from the same side of the elongated wall 218 along the length thereof. The flanged clip 226 extends upwardly from the opposite end of the locking rib 224 at approximately the midpoint of the elongated wall 218 such that it overlaps the elongated wall 218. A lower portion 230 of the flanged clip 226 is generally parallel to the elongated wall 218 and an upper portion 232 of the flanged clip 226 angles inwardly toward the elongated wall 218. As a result, a single replacement saw blade 22' or multiple replacement saw blades can be mounted between the flanged clip 226 and the elongated wall 218 and rests on the support rib 224. The rear end of the saw portion of the replacement saw blade 22' rests on the support rib 224 and is also captured between the flanged clip 226 and the wall 218. The second reduced portion of the replacement saw blade 22' is positioned between the lower and upper support walls 220, 222.

The latch 216 extends from the rear wall 212 in the same direction as the plate 214, such that it is horizontal. The latch 216 includes an arm 234 that extends from the rear wall 212 to a hook 236 at the free end of the arm 234. The hook 236 extends downwardly from the arm 234 and away from the plate 214. The arm 234 can be deflected upwardly from its horizontal position.

Upon insertion of the spare blade holder 28 into the rear end of the housing 24, the plate 214 slides along the second groove 68. Once the latch 216 enters into the housing 24, the hook 236 on the end of the arm 234 contacts the cam surface 86 on the release 76 which causes the arm 234 to deflect upwardly. Once completely inserted, the hook 236 passes over the retaining wall 78 and enters into the pocket 88. The arm 234 then resumes its naturally horizontal state, thereby locking the spare blade holder 28 in place. The spare blade holder 28 cannot be pulled out without releasing the engagement of the hook 236 from the pocket 88.

To release the spare blade holder 28, the user presses on the exterior surface the release 76. Upon depression, the release 76 flexes inwardly toward the center of the housing 24 which causes the topmost point of the cam surface 86 to bear against the arm 234, thereby deflecting the arm 234 upwardly. When the arm 234 is deflected a distance which is greater than the height of the hook 234, the hook 234 is released from the pocket 88 and the and spare blade holder 28 can be pulled from the rear end of the housing 24. A spare blade 22' can then be removed from the spare blade holder 28 by pulling upwardly on the spare blade 22' to deflect the flanged clip 226 away from the wall 218 and sliding the spare blade 22' outwardly, upwardly and away from the plate 214. Thereafter, the spare blade 22' can be inserted into the saw blade sliding and attachment mechanism 26 as discussed herein. Thereafter, new spare blades (not shown) can be inserted into the spare blade holder 28, if desired, and the spare blade holder 28 reassembled with the housing 24.

The release for the spare blade holder 28 is preferably provided on the lower surface of the lower housing 30 so that the chance of accidental depression by the user, and consequential release, of the spare blade holder 28 is minimized. The spare blade holder 28 can be accessed without the need for another tool, such as a screwdriver, as is required in other cutting tools.

As a result of the construction of the saw tool 20, a user can easily remove a saw blade 22 when it has become dull or to use a different type of saw blade without taking the tool 20 apart, thereby saving time in the field.

While a preferred embodiment of the present invention is shown and described, it is envisioned that those skilled in the art may devise various modifications of the present invention without departing from the spirit and scope of the appended claims.

The invention claimed is:

1. A tool into which a saw blade can be mounted and removed therefrom, said tool comprising:
   a housing, said housing have a groove defined therein;
   an attachment assembly mounted in said groove in said housing, said attachment assembly being capable of sliding within said groove relative to said housing, said attachment assembly including a first part, a second part, and a member attaching said second part to said first part while allowing said second part to move relative to said first part, wherein the saw blade can be inserted between said first and second parts so that the saw blade is sandwiched between said first and second parts, the saw blade being removable therefrom; and
   a spring retainer affixed within said housing, said spring retainer capable of being in an undeflected condition and a deflected condition, said attachment assembly being moveable within said housing to abut against said spring retainer, wherein when said attachment assembly abuts said spring retainer, said second part can be moved out of engagement with said first part to allow the removal of the saw blade from between the first and second parts, said second part engaging against said spring retainer and moving said spring retainer into said deflected condition when said second part is moved out of engagement with said first part.

2. A tool as defined in claim 1, wherein said spring retainer includes a leg attached to said housing, but deflectable relative thereto) and an arcuate arm attached to said leg, said second part of said attachment assembly being engageable against said arcuate arm.

3. A tool as defined in claim 2, wherein said leg of said, spring retainer is vertical and said spring retainer further includes a horizontal leg attached thereto and attached to said housing, said attachment assembly sitting on said horizontal leg when said attachment assembly abuts said spring retainer.

4. A tool as defined in claim 1, wherein said member extends outwardly from said housing and said second part of said attachment assembly is moved out of engagement with said first part by a user pushing said member.

5. A tool as defined in claim 1, wherein said member includes a threaded portion and further including a knob mounted on said threaded portion, said knob being translatable on said threaded portion such that said knob can be engaged with said housing or disengaged from said housing.

6. A tool as defined in claim 1, wherein said second part of said attachment assembly has a protrusion provided therein and said first part of said attachment assembly includes a recess into which said protrusion is insertable and releasable therefrom when said second part of said attachment assembly is moved out of engagement with said first part.

7. A tool as defined in claim 6, wherein said protrusion has a tapered surface thereon.

8. A tool as defined in claim 7, wherein said first and second parts have chamfers provided thereon on the end through which the saw blade is to be inserted.

9. A tool as defined in claim 1, wherein said second part is an insert mounted within an aperture in said first part.

10. A tool as defined in claim 9, wherein said second part of said attachment assembly has a protrusion provided therein and said first part of said attachment assembly includes a recess into which said protrusion is insertable and releasable therefrom when said second part of said attachment assembly is moved out of engagement with said first part.

11. A tool as defined in claim 1, wherein said housing includes a lower housing and an upper housing which are mated together, one of said lower and upper housing have ribs provided thereon which mate into pockets provided in the other of said lower and upper housings.

12. A tool as defined in claim 1, wherein said spring retainer is formed of spring steel.

13. A tool as defined in claim 1, further including a blade holder attached to said housing.

14. A tool as defined in claim 13, wherein said blade holder includes a latch releasably engaged with said housing.

15. A tool as defined in claim 14, wherein said latch includes an arm and a hook at a free end of said arm, said housing including a cam surface and a pocket adjacent said cam surface, said hook being engageable with said cam surface and said pocket.

16. A tool into which a saw blade can be mounted and removed therefrom, said tool comprising:
    a housing, said housing have a groove defined therein;
    an attachment assembly mounted in said groove in said housing, said attachment assembly being capable of sliding within said groove relative to said housing, said attachment assembly including a first part, a second part insertable into an aperture in said first part, and a member attaching said second part to said first part while allowing said second part to move relative to said first part, the saw blade being insertable between said first and second parts and removed therefrom, said second part having a protrusion provided thereon and said first part including a recess into which said protrusion is insertable and releasable therefrom, and said member including a threaded portion, said member extending outwardly from said housing;
    a knob mounted on said threaded portion of said member and translatable thereon such that said knob can be engaged with said housing or disengaged from said housing;
    a spring retainer affixed within said housing, said spring retainer including a vertical leg attached to said housing, but deflectable relative thereto, and an arcuate arm attached to said leg and a horizontal leg attached thereto and attached to said housing, said attachment assembly being moveable within said housing to abut against said vertical leg and said arcuate arm and to sit on said horizontal leg,
    wherein when said attachment assembly abuts said vertical leg, said second part can be moved out of engagement with said first part by a user pushing on said member to allow the removal of the saw blade from between the first and second parts.

17. A tool as defined in claim 16, wherein said protrusion has a tapered surface thereon and said first and second parts have chamfers provided thereon on the end through which the saw blade is to be inserted.

18. A tool as defined in claim 16, further including a blade holder attached to said housing.

* * * * *